(12) United States Patent
Nakamura et al.

(10) Patent No.: US 8,503,172 B2
(45) Date of Patent: Aug. 6, 2013

(54) SUPPLEMENTARY COOLING SYSTEM

(75) Inventors: Fusanobu Nakamura, Kanagawa-ken (JP); Hiroaki Agata, Kanagawa-ken (JP)

(73) Assignee: Lenovo Pte. Ltd., New Tech Park (SG)

( * ) Notice: Subject to any disclaimer, the term of this patent is extended or adjusted under 35 U.S.C. 154(b) by 208 days.

(21) Appl. No.: 12/768,931

(22) Filed: Apr. 28, 2010

(65) Prior Publication Data
US 2011/0267769 A1 Nov. 3, 2011

(51) Int. Cl.
*H05K 7/20* (2006.01)
*F28F 7/00* (2006.01)
*H05K 5/00* (2006.01)
*G06F 13/00* (2006.01)

(52) U.S. Cl.
USPC ............ 361/679.49; 361/679.48; 361/679.51; 361/695; 361/679.41; 165/80.3; 257/713; 454/184; 710/303; 710/304

(58) Field of Classification Search
USPC ............ 361/679.46, 679.48, 679.49, 679.51, 361/679.41–679.44, 695; 165/80.2–80.3; 454/184; 710/303–304
See application file for complete search history.

(56) References Cited

U.S. PATENT DOCUMENTS

| | | | | |
|---|---|---|---|---|
| 5,768,101 | A | * | 6/1998 | Cheng ....................... 361/679.41 |
| 6,038,128 | A | * | 3/2000 | Hood et al. ............... 361/679.41 |
| 6,239,970 | B1 | * | 5/2001 | Nakai et al. ................... 361/695 |
| 6,266,243 | B1 | * | 7/2001 | Tomioka ........................ 361/695 |
| 6,353,536 | B1 | * | 3/2002 | Nakamura et al. ........ 361/679.41 |
| 6,574,102 | B2 | | 6/2003 | Usui |
| 7,019,968 | B2 | * | 3/2006 | Kitahara ....................... 361/695 |
| 7,110,254 | B2 | * | 9/2006 | Hara et al. ............... 361/679.26 |
| 8,043,756 | B2 | * | 10/2011 | Kim et al. ..................... 429/436 |
| 2002/0018335 | A1 | * | 2/2002 | Koizumi ....................... 361/687 |
| 2005/0168942 | A1 | * | 8/2005 | Steinbrecher ................. 361/690 |

FOREIGN PATENT DOCUMENTS

| | | |
|---|---|---|
| JP | 2008-112225 A | 5/2008 |
| JP | 2009-237649 | 10/2009 |

* cited by examiner

*Primary Examiner* — Zachary M Pape
(74) *Attorney, Agent, or Firm* — Shimokaji & Assoc., PC

(57) ABSTRACT

A supplementary cooling system is provided for cooling a computing system. An apparatus may comprise a computing system and a docking system. The computing system has a cooling area and a fan area which is partionable from the cooling area. The docking system has a fan and an airflow outlet which is operably connected to the fan.

13 Claims, 5 Drawing Sheets

SUPPLEMENTARY COOLING SYSTEM

BACKGROUND OF THE INVENTION

The present invention relates generally to computer hardware, and more specifically, to supplementary cooling of computing systems.

Heat dissipation is an important consideration in the design of modern-day computer systems, especially portable computers such as notebook-sized personal computers (hereinafter referred to as "notebook PCs"). Major sources of heat in such notebook PCs include microprocessors and hard disk drive assemblies.

Cooling systems are typically stand-alone components used in computing systems to maintain the temperatures of various electronic devices within certain specified ranges. Sometimes, the heat generated by an electronic device may increase after a cooling system design is fixed or implemented. For example, in the case of a processor, the average processing level at which the processor operates may increase if the primary use of the computing system changes from a low processing level application (such as word processing) to a high processing level application (such as playing video games). The increase in average processing level may cause the processor to generate more heat. If the existing cooling system does not have the capacity to counter the increased levels of generated heat, then the operating efficiency of the computing system may be impaired.

Therefore, it can be seen that there is a need for apparatus and methods for supplemental cooling of computing systems.

SUMMARY

In one aspect, a docking system comprises a docking fan; a docking outlet operably connected to the docking fan; the docking outlet for operable connection to a computing cooling area of a computing system; and the docking outlet for restricting an airflow to the computing cooling area and not a computing fan area of the computing system.

In another aspect, a computing system comprises a computing component; a computing cooling area in operable connection with the computing component; a fan; a computing fan area in which the fan is disposed; wherein the computing fan area is partionable from the computing cooling area.

In a further aspect, a method for cooling a computing system comprises moving an airflow out of a docking system adjacent to the computing system; and directing the airflow from the docking system and into a computing cooling area of the computing system; wherein the computing cooling area is partionable from a computing fan area of the computing system.

These and other features, aspects and advantages of the present invention will become better understood with reference to the following drawings, description and claims.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments provide methods and systems for cooling a computing system. More specifically, exemplary embodiments enable airflow from a docking system to the computing system, thereby reducing internal heat of the computing system when docked to the docking system. According to exemplary embodiments, the docking system provides airflow to a cooling area of the computing system, wherein the cooling area is partitionable from a fan area of the computing system. In exemplary embodiments, a partition between the fan area and the cooling area is provided by a partition member that is a part of the docking system or a part of the computing system.

Figure 1:
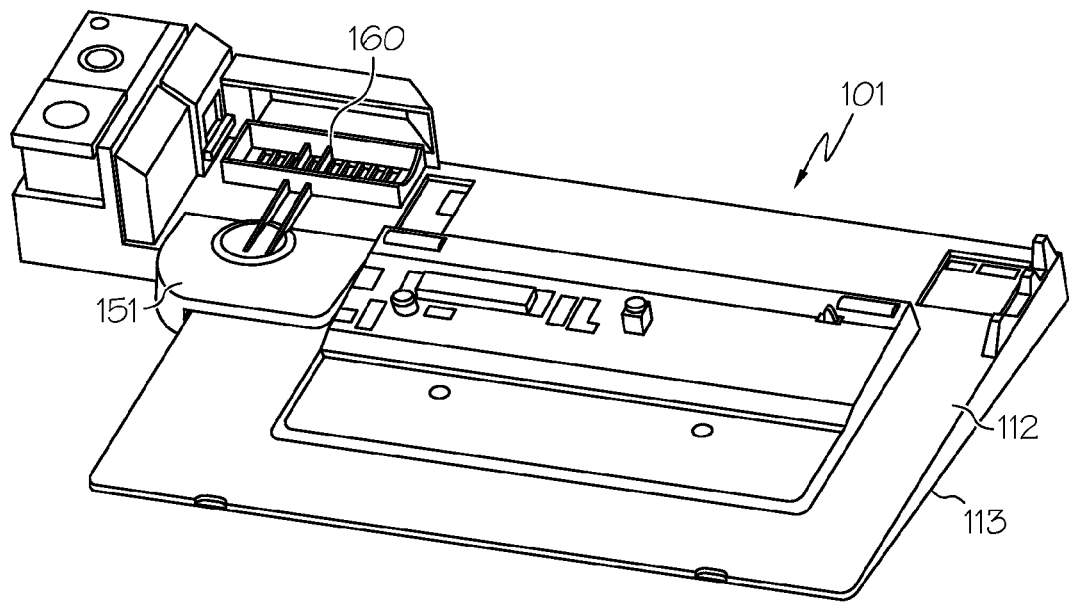
FIG. 1 is a perspective view of an exemplary embodiment of a docking system.
Figure 2:
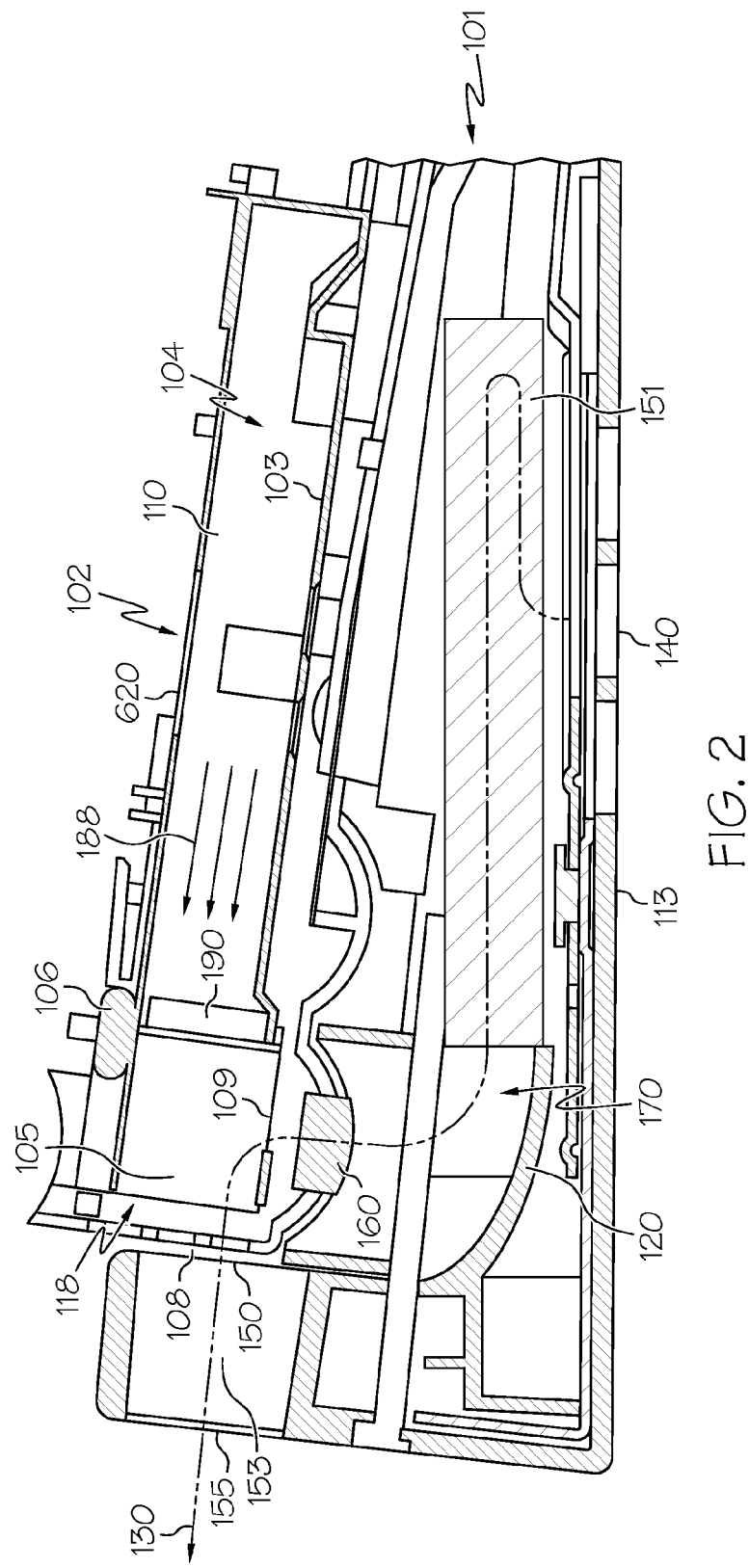
FIG. 2 is a side, cross-sectional view of an exemplary embodiment of a computing system docked into the docking system of FIG. 1.

FIG. 1 illustrates a perspective view of an exemplary embodiment of a docking system 101. The docking system 101 may include a front surface or base 112 on which a computing system 102 (FIG. 2) may sit while docked in the docking system 101. The docking system 101 may also include a back surface 113 that is opposite the base 112. A docking fan 151 may be disposed within the docking system 101. The docking fan 151 may operate to draw air from outside the docking system 101 via a plurality of airflow slits 140 (FIG. 2). At least a portion of the air may be forced by the docking fan 151 to flow out through a docking outlet 160 located at the front surface 112.

FIG. 2 shows a side, cross-sectional view the docking system 101 to which a computing system 102 is docked. In the docking system 101, an air duct 120 may be operably connected to the docking fan 151. The air duct 120 may serve as an air ventilation path for air flowing from the docking fan 151 to the docking outlet 160. The docking outlet 160 may operably interface a computing inlet 109 of the computing system 102, as described below. More specifically, when the computing system 102 is docked on the docking system 101, the docking outlet 160 may adjoin with the computing inlet 109.

A cooling module 170, such as a Peltier module, may be disposed inside the duct 120 between the docking fan 151 and the docking outlet 160. The cooling module 170 may be used to cool an airflow 130 coming from the docking fan 151.

Still in FIG. 2, the docking system 101 may further include a partition member 190. The partition member 190 may be inserted into the computing system 102 when the computing system 102 is docked into the docking system 101. Furthermore, the docking system 101 may include an airflow inlet 150, an airflow outlet 155, and an air duct 153 therebetween. The airflow inlet 150 may receive the airflow 130, as discussed below, as it exits the computing system 102.

As shown in FIG. 2, the computing system 102 may include a computing cooling area 105 and a computing fan area 110. The cooling area 105 can function to provide an air path for cool air from the docking system 101 to flow through the computing system 102. The fan area 110 can function to provide an area to hold the computing fan 104.

The computing fan area 110 and the cooling area 105 may be partitionable by the partition member 190. In one exemplary embodiment, the fan area 110 is partitioned from the cooling area 105 when the partition member 190 is a part of the docking system 101 and is inserted into the computing system 102. In another exemplary embodiment, the partition member 190 may be a part of the computing system 102. In either embodiment, the partition member 190 may be disposed to operably interface the computing cooling area 105 and the computing fan area 110. Consequently, the partition member 190 may block an airflow 188 generated by the computing fan 104 flowing from air slits 103, through the fan area 110, and to the cooling area 105.

The computing system 102 may further include a heat radiation fin 118 installed in the cooling area 105 of the computing system 102. The heat radiation fin 118 may function to dissipate heat collected from the computing system 102. For example, if one part of the cooling area 105 was warmer than another part, the heat radiation fin 118 may help evenly dissipate heat from the computing system 102 evenly across the cooling area 105, resulting in an increased efficiency of cooling. In addition, a heat pipe 106 may also be operably connected to the cooling area 105, for example. The heat pipe 106 may be interconnected to a CPU plate (not shown) of the computing system 102 to help dissipate heat generated from a CPU. In an exemplary embodiment, a temperature sensor (not shown) may be installed in the computing system 102 to measure the temperature of the computing system 102. If the temperature inside the computing system is higher than a set limit, the CPU unit of the computing system 102 may send a signal to a controller (not shown) in the docking system 101. In turn, the controller in the docking system 101 may increase the speed of the docking fan 151.

The computing system 102 may additionally include a computing outlet 108 operably affixed to the heat radiation fin. The outlet 108 is operably adjacent to the docking inlet 150 of the docking system 101 when the computing system 102 is docked to the docking system 101.

Figure 3:
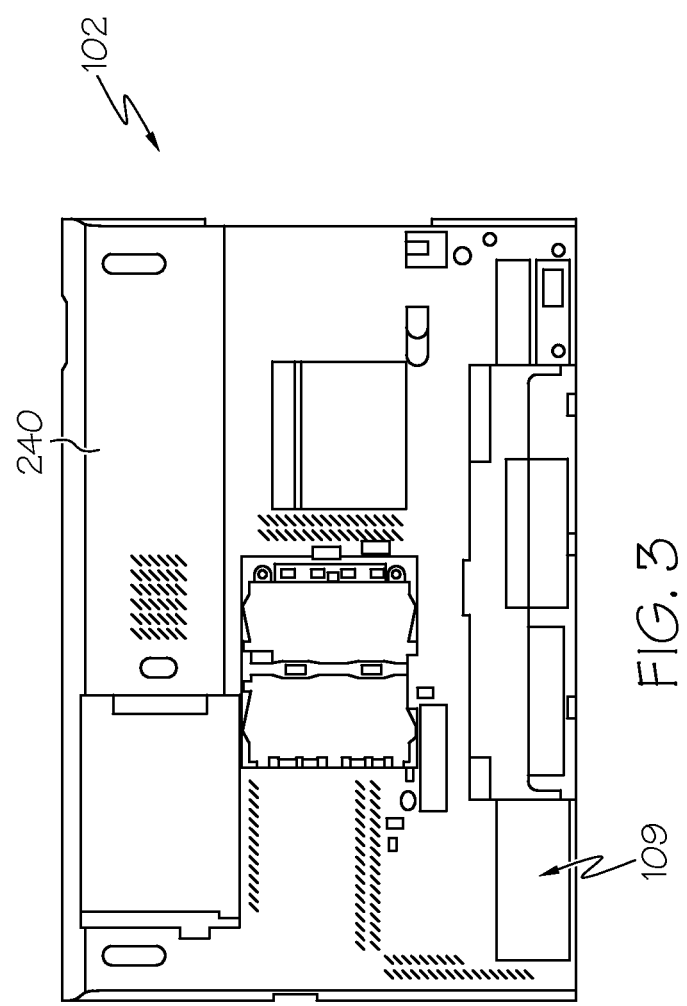
FIG. 3 is a plan view of an exemplary embodiment of the computing system of FIG. 2.

FIG. 3 shows a plan view of the computing system 102 that may be used with the docking system 101. The computing system 102 may include a back side 240 at which the computing inlet 109 is located. The computing inlet 109 may align with the docking outlet 160 of the docking system 101 when the computing system 102 is docked into the docking system 101.

In operation, the docking fan 151 may drive the airflow 130 from the airflow slits 140 of the docking system 101 through the docking fan 151, the duct 120, the docking outlet 160, and the computing inlet 109. The airflow 130 may continue to flow to the cooling area 105 of the computing system 102, through the air outlet 108, through the inlet 150, through the duct 153, and then vent out through airflow outlet 155.

The docking outlet 160 may restrict the airflow 130 from the docking system 101 to the computing cooling area 105. Moreover, the airflow 130 in the computing cooling area 105 may absorb heat from the heat pipe 106 and/or the heat radiation fin 118. In addition, the airflow 130 from the docking system 101 may further cool the airflow 188 via heat exchange across the partition member 190.

Figure 4:
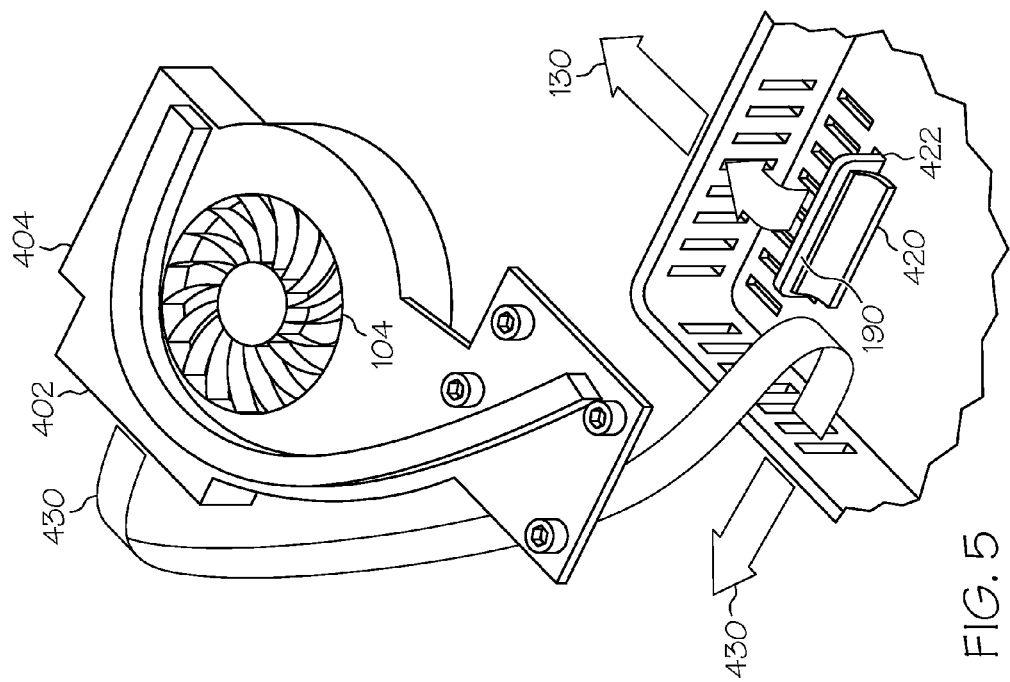
FIG. 4 is a partial, exploded view of an exemplary embodiment of a computing system fan before a computing system is docked on a docking system.

FIG. 4 is a partial, exploded view of the computing fan 104 with two heat sinks 402 and 404. When the computing system 102 is not docked on the docking system 101, and the docking system 101 includes the partition member 190, the computing fan 104 may force a first airflow 430 past the heat sink 402, and force a second airflow 188 past the second heat sink 404. In an exemplary embodiment, a partition receiving member 420 may be attached to an outside surface 424 of the computing duct 620 (see FIG. 6) and may lay at least partially in front of a partition member receiving opening 422.

Figure 5:
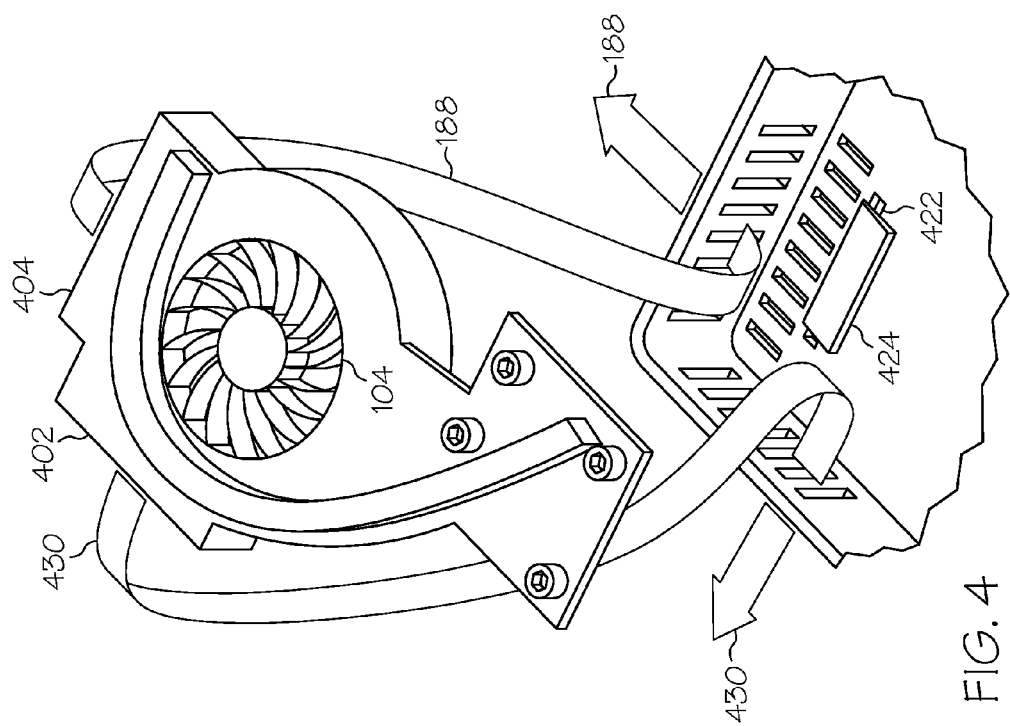
FIG. 5 is a partial, exploded view of the computing system fan shown in FIG. 4 after the computing system is docked on the docking system.

As shown in FIG. 5, when the computing system 102 is docked on the docking system 101, the airflow 430 may flow from the computing fan 104 through the heat sink 402 and vent out. As the partition member 190 is inserted into the partition member receiving opening 422, the partition receiving member 420 may move away from the partition member receiving opening 422 but remains in contact with the partition member 190. In one embodiment, the partition receiving member 420 may be a flexible member that may flex against the partition member 190 as it is inserted into the partition member receiving opening 422. The partition member 190 and the partition receiving member 420 may facilitate blocking the airflow 188 while the airflow 430 is not interrupted.

Figure 6:
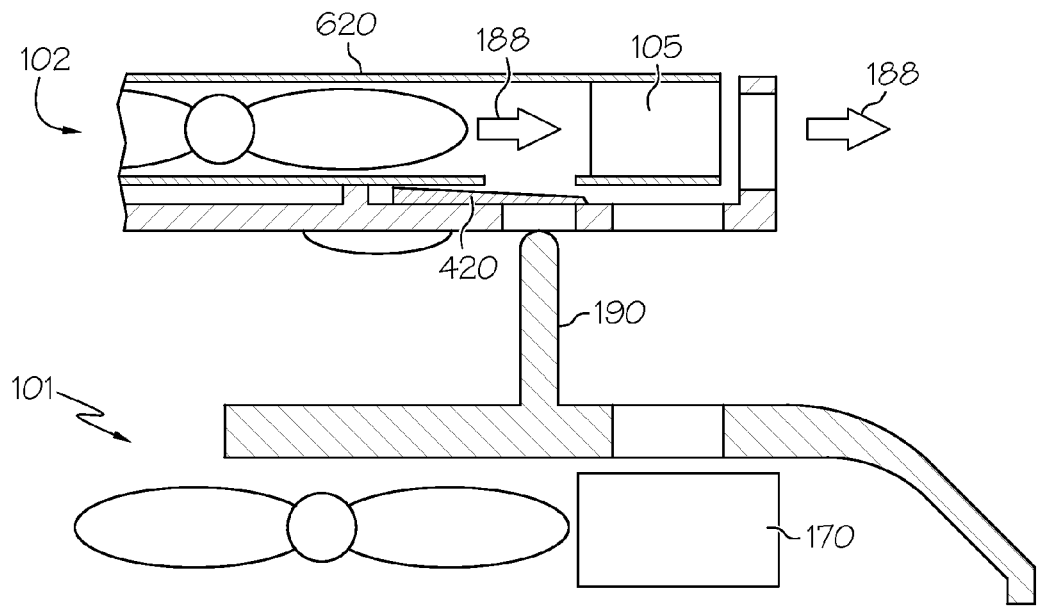
FIG. 6 is a side schematic view of an exemplary embodiment of a partition member before a computing system is docked on a docking system.

FIG. 6 is a side schematic view illustrating an exemplary embodiment of the partition member 190 prior to insertion into the partition receiving opening 422 and the computing duct 620 during the docking of the computing system 102 on the docking system 101.

Figure 7:
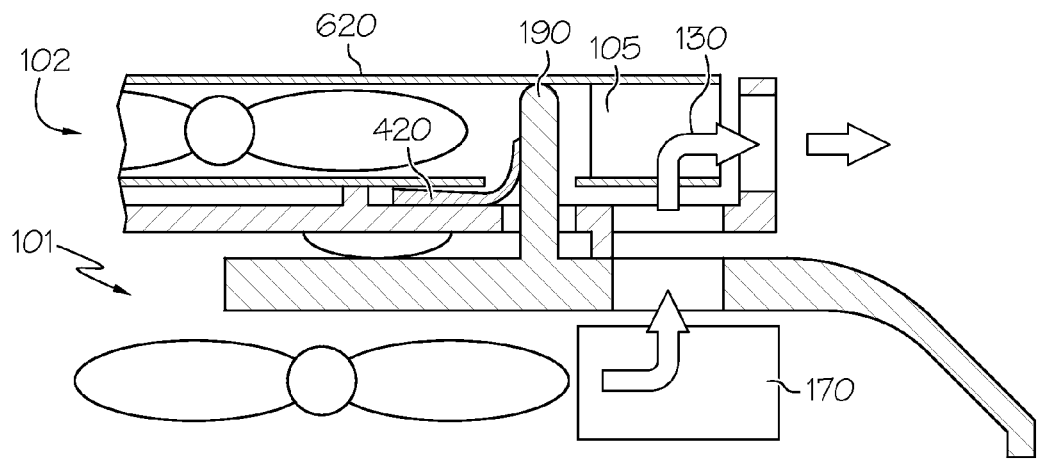
FIG. 7 is a side schematic view of an exemplary embodiment of the partition member shown in FIG. 6 after the computing system is docked on the docking system.

FIG. 7 shows an exemplary embodiment of the partition member 190 after insertion into the computing duct 620. The partition receiving member 420 may be pushed into the computing duct 620 after the computing system 102 is docked on the docking system 101. Airflow 188 may be blocked by the partition member 190 and the partition receiving member 420. Furthermore, the partition member 190 and the partition receiving member 420 may fit together snugly so that the airflow 130 from the docking system 101 may not enter into the computing system through the computing duct 620, thus preventing water vapor in airflow 130 from condensating on the computing electronics inside the computing system 102. Water condensation on the electronics may cause electrical shorts. Instead, the airflow 130, after being cooled by the cooling module 170, may be restricted to the cooling area 105.

It should be understood, of course, that the foregoing relate to exemplary embodiments of the invention and that modifications may be made without departing from the spirit and scope of the invention as set forth in the following claims.

We claim:
1. A docking system, comprising:
a docking fan;
a docking outlet operably connected to the docking fan;
the docking outlet adapted for operable connection to a computing cooling area of a computing system when the computing system is docked to the docking system;
the docking outlet adapted for restricting an airflow from the docking fan to the computing cooling area and not to a computing fan area of the computing system when the computing system is docked to the docking system; and
a flat partition member disposed between the computing cooling area and the computing fan area when the computing system is docked to the docking system, the flat partition member configured to block the airflow from the docking fan from passing into the computing fan area from the computing cooling area when the computing system is docked to the docking system; and a flexible partition receiving member disposed at least partially covering a partition member receiving opening in the computing system, wherein the flexible partition receiving member is configured to receive the flat partition member of the docking system when the computing system is docked to the docking system.

2. The docking system of claim 1, wherein the docking outlet is disposed to operably interface a computing system inlet of the computing system.

3. The docking system of claim 1, further comprising a cooling module disposed between the docking fan and the docking outlet.

4. The docking system of claim 1, wherein the docking fan is controlled by the computing system.

5. A computing system configured to dock with a docking system, comprising:
   a computing component;
   a computing cooling area in operable connection with the computing component;
   a fan;
   a computing fan area in which the fan is disposed;
   wherein the computing fan area is partitioned from the computing cooling area by a flat partition member disposed between the computing fan area and the computing cooling area to prevent an airflow from the computing cooling area from flowing into the computing fan area; and
   a flexible partition receiving member disposed at least partially covering a partition member receiving opening in the computing system, wherein the flexible partition receiving member is configured to receive the flat partition member of the docking system when the computing system is docked to the docking system.

6. The computing system claim 5, wherein the partition member is further disposed to block an airflow from the computing fan area into the computing cooling area.

7. The computing system of claim 5, wherein the partition member is insertable into the computing system when docked to the docking system.

8. The computing system of claim 5, further comprising a heat radiation fin in the computing cooling area.

9. The computing system of claim 5, further comprising a heat sink adjacent to the computing fan.

10. A method for cooling a computing system, comprising:
    docking the computing system with a docking system, the docking comprising:
      engaging a flat partition member of the docking system with a partition member receiving opening in the computing system to move a flexible partition receiving member away from the partition member receiving opening;
      wherein a computing fan area in the computing system is partitioned from a computing cooling area in the computing system by the flat partition member that is disposed to prevent an airflow from the computing cooling area from flowing into the computing fan area;
    moving an airflow out of the docking system; and
    directing the airflow from the docking system and into the computing cooling area of the computing system.

11. The method of claim 10, further comprising cooling the airflow in the docking system before moving the airflow out of the docking system.

12. The method of claim 10, further comprising cooling the airflow in the computing cooling area.

13. The method of claim 10, further comprising preventing an exchange of air from the computing cooling area to the computing fan area.

* * * * *